United States Patent [19]

Grobert

[11] Patent Number: 4,734,701

[45] Date of Patent: Mar. 29, 1988

[54] NULL PROCESSING RECEIVER APPARATUS AND METHOD

[75] Inventor: Paul H. Grobert, Granada Hills, Calif.

[73] Assignee: Magnavox Government and Industrial Electronics Company, Fort Wayne, Ind.

[21] Appl. No.: 838,920

[22] Filed: Mar. 12, 1986

[51] Int. Cl.[4] .................................... G01S 3/16

[52] U.S. Cl. .................................... 342/380; 342/378; 342/382

[58] Field of Search ............... 342/378, 379, 380, 382, 342/383

[56] References Cited

U.S. PATENT DOCUMENTS

| | | | |
|---|---|---|---|
| 3,981,014 | 9/1976 | Masak | 342/380 |
| 4,070,675 | 1/1978 | Daniel et al. | 342/380 |
| 4,079,380 | 3/1978 | Esry et al. | 342/379 |
| 4,105,977 | 8/1978 | Fitting et al. | 342/380 |
| 4,161,733 | 7/1979 | Piesinger | 342/380 |
| 4,217,586 | 8/1980 | McGuffin | 342/380 |
| 4,236,158 | 11/1980 | Daniel | 342/380 |
| 4,268,829 | 5/1981 | Baurle et al. | 342/380 |
| 4,280,128 | 7/1981 | Masak | 342/380 |

*Primary Examiner*—Theodore M. Blum
*Assistant Examiner*—David Cain
*Attorney, Agent, or Firm*—Roger M. Rickert; William J. Streeter; Richard T. Seeger

[57] ABSTRACT

A null processing receiver apparatus that receives and combines together a number of modulated information signals in such a fashion that an interference or jamming signal superimposed on each received signal is substantially eliminated from the combined signal. The apparatus first demodulates each received signal to baseband, to produce a primary demodulated signal and one or more auxiliary demodulated signals. The apparatus then appropriately weights the one or more auxiliary signals and sums together the weighted signals with the primary signal to produce a sum signal in which the interference is substantially nulled out. The weighting is based on a cross-correlation of the sum signal with the baseband signals themselves.

22 Claims, 2 Drawing Figures

NULL PROCESSING RECEIVER APPARATUS AND METHOD

BACKGROUND OF THE INVENTION

This invention relates generally to apparatus for receiving and combining together a plurality of modulated signals, and, more particularly, to apparatus of this kind that controllably weight the various signals being combined so as to null out an interference signal superimposed on each one.

Null processing receivers of this kind are useful in numerous applications. One example is a system for processing signals received by a multi-element antenna array in the presence of an interference (e.g., jamming) signal received from an unspecified, variable direction. In such a system, the modulated rf signals supplied by the various antenna elements are typically summed together to produce a sum signal for subsequent down-converting, demodulation and baseband processing. Prior to summation, each rf signal is controllably adjusted in amplitude and phase angle (i.e., complex weighted) so as to null or cancel out the presence of the interference signal in the sum signal. This adaptive interference cancelation is usually performed in a way that minimizes the sum signal's power, since it is assumed that the power of the interference signal greatly exceeds that of the desired information signal.

Since the direction from which the interference signal is received by the antenna elements can vary, the complex weighting must be controllably adjustable in order to maintain continuous nulling. This adjustment actually steers the spatial nulls present in the composite antenna pattern, to align a particular spatial null with the detected interference signal direction.

The modulated antenna signals whose amplitudes and phase angles are being continuously adjusted are at radio frequencies, typically L-band. Circuitry for effecting this adjustment typically includes highly sensitive microstrips, strip lines, and minute coils of wire, all of which can require sensitive trimming. Not only is such circuitry considered not entirely reliable, but it also is considered excessive in size, weight, power consumption and cost.

It should therefore be appreciated that there is a definite need for a null processing receiver of the kind described above that not only provides improved reliability, but also a reduction in size, weight, power consumption and cost. The present invention fulfills this need.

SUMMARY OF THE INVENTION

The invention is embodied in a signal processing receiver apparatus that combines a plurality of received signals in a prescribed fashion, to null out an interference signal contained in each of them, the processing being effected without the need for an amplitude or phase angle adjustment of any rf signals. The apparatus is substantially reduced in size, weight, power consumption and cost, yet it provides equal if not improved effectiveness in nulling out the interference signal and it has a substantially improved reliability.

More particularly, the signal processing receiver apparatus of the invention receives and demodulates a plurality of signals, each for example received from a separate antenna element, to produce a primary information signal and one or more related auxiliary information signals. The interference signal is contained within all of these information signals. Weighting means operates on each of the auxiliary signals, to produce a corresponding number of weighted or intermediate signals, and summing means sums together the primary signal and the one or more intermediate signals to produce a sum signal in which the interference signal is substantially nulled out. The weighting means includes correlation means responsive to the one or more auxiliary signals, for producing a corresponding number of weighting signals, and multiplier means for multiplying the auxiliary signals by their corresponding weighting signals, to produce the intermediate signals.

In the preferred embodiment, the correlation means includes a plurality of multipliers or mixers and an equal number of integrators. Each mixer multiplies the sum signal by a separate one of the auxiliary information signals, to produce a product signal that is integrated by the corresponding integrator to produce one of the weighting signals.

The apparatus of the invention has particular utility where the signals received from the various antenna elements are carrier signals modulated by a predetermined digital code signal (e.g., a pseudorandom code). In such a system, the demodulator means down-converts each modulated signal using a common local oscillator signal and then multiplies each such down-converted signal by a common, locally-generated replica of the predeter mined digital code signal. This removes the digital code signal and ultimately yields the primary and auxiliary information signals.

The apparatus of the invention preferably operates at a predetermined duty cycle. In one part of the cycle, the apparatus functions as described above to null out the interference signal, while in another part of the cycle, the various weighting signals are maintained at their current levels. During the latter part of the cycle, the resulting sum signal is processed further, to extract certain data from it. To ensure that the apparatus does not null out the desired information signal, a bogey code can be substituted for the digital code replica during the former part of the cycle, when nulling is being effected.

In another aspect of the invention, the apparatus operates as quadrature receiver, with each received modulated signal being multiplied by a pair of orthogonal carrier signals. This produces a pair of primary information signals and one or more pairs of related auxiliary information signals. Each primary signal is summed with a different set of intermediate signals created based on the entire set of auxiliary signals, in substantially the same manner as described above.

Other aspects and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
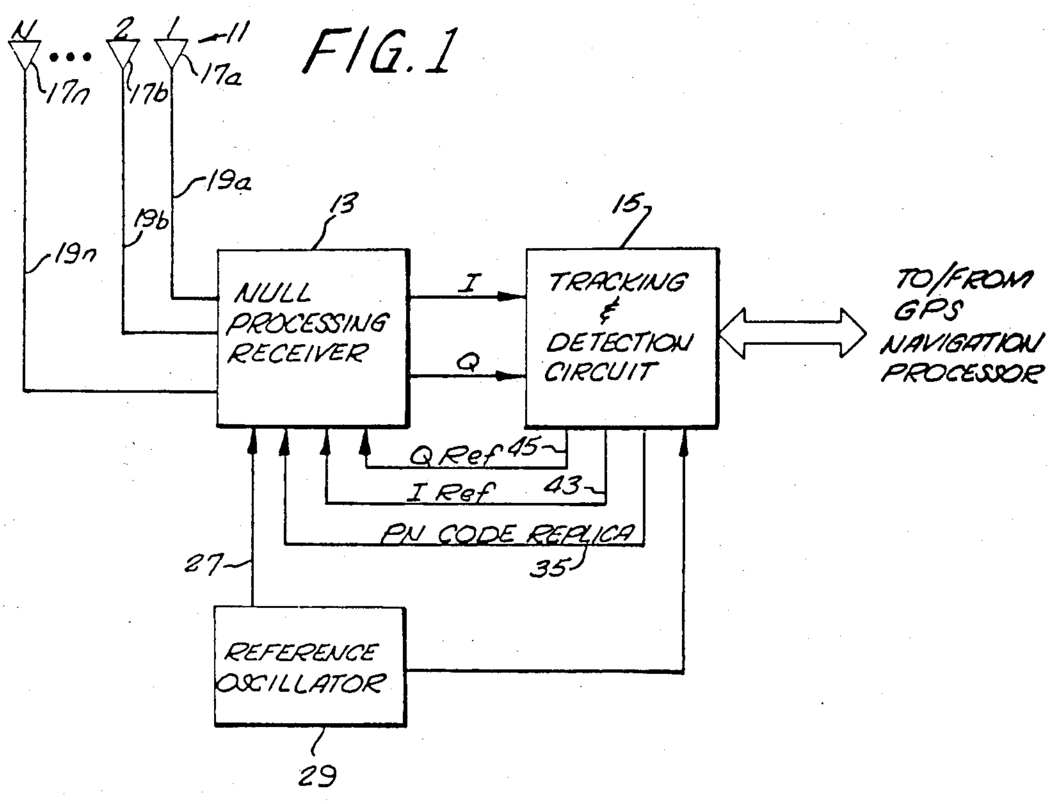
FIG. 1 is a simplified block diagram of the receiver portion of a Global Positioning System (GPS), which includes a null processing receiver embodying the present invention.

With reference now to the drawings, and particularly to FIG. 1, there is shown a simplified block diagram of a portion of a Global Positioning System (GPS) that receives a number of modulated rf signals from an antenna array 11 and detects one or more binary codes originally transmitted from a corresponding number of orbiting satellites. The detected codes are supplied to a GPS navigation processor, which processes the codes to determine the receiver's precise geographic location. The modulated signals received from the antenna array can sometimes contain interference in the form of a jamming signal. A null processing receiver 13 and tracking and detection circuit 15 suitably processes the modulated signals to substantially eliminate this interference from the codes supplied to the GPS navigation processor.

As shown in FIG. 1, the antenna array 11 includes N elements, designated 17*a*–17*n*. The modulated antenna signals are supplied on lines 19*a*–19*n* to the null processing receiver 13, which demodulates and combines the signals in a prescribed fashion to produce quadrature I and Q data signals. These data signals are supplied on lines 21 and 23, respectively, to the tracking and detection circuit 15, which extracts certain information from the signals and supplies the information to the GPS navigation processor. The tracking and detection circuit, which is of conventional design, also generates various reference signals used by the null processing receiver to properly demodulate the incoming antenna signals.

In producing the quadrature I and Q data signals output on lines 21 and 23, the null processing receiver 13 combines the various antenna signals together in such a fashion that a strong interference signal (i.e., a jamming signal) contained in the antenna signals is substantially nulled out. In the past, receivers of this kind achieved this nulling by a complex weighting, i.e., amplitude and phase angle adjustment, of the received antenna signals prior to summation. This has necessarily required the use of controllably adjustable rf circuitry for gain and phase matching, which is usually highly sensitive and difficult to use and adjust.

In accordance with the invention, the null processing receiver 13 combines the information contained in the antenna signals received on lines 19*a*–19*n* without the need for any complex weighting of the rf signals. Rather, the receiver weights the various signals after demodulation and conversion to digital formats. This greatly simplifies the receiver and significantly reduces its cost, weight and power consumption.

Figure 2:
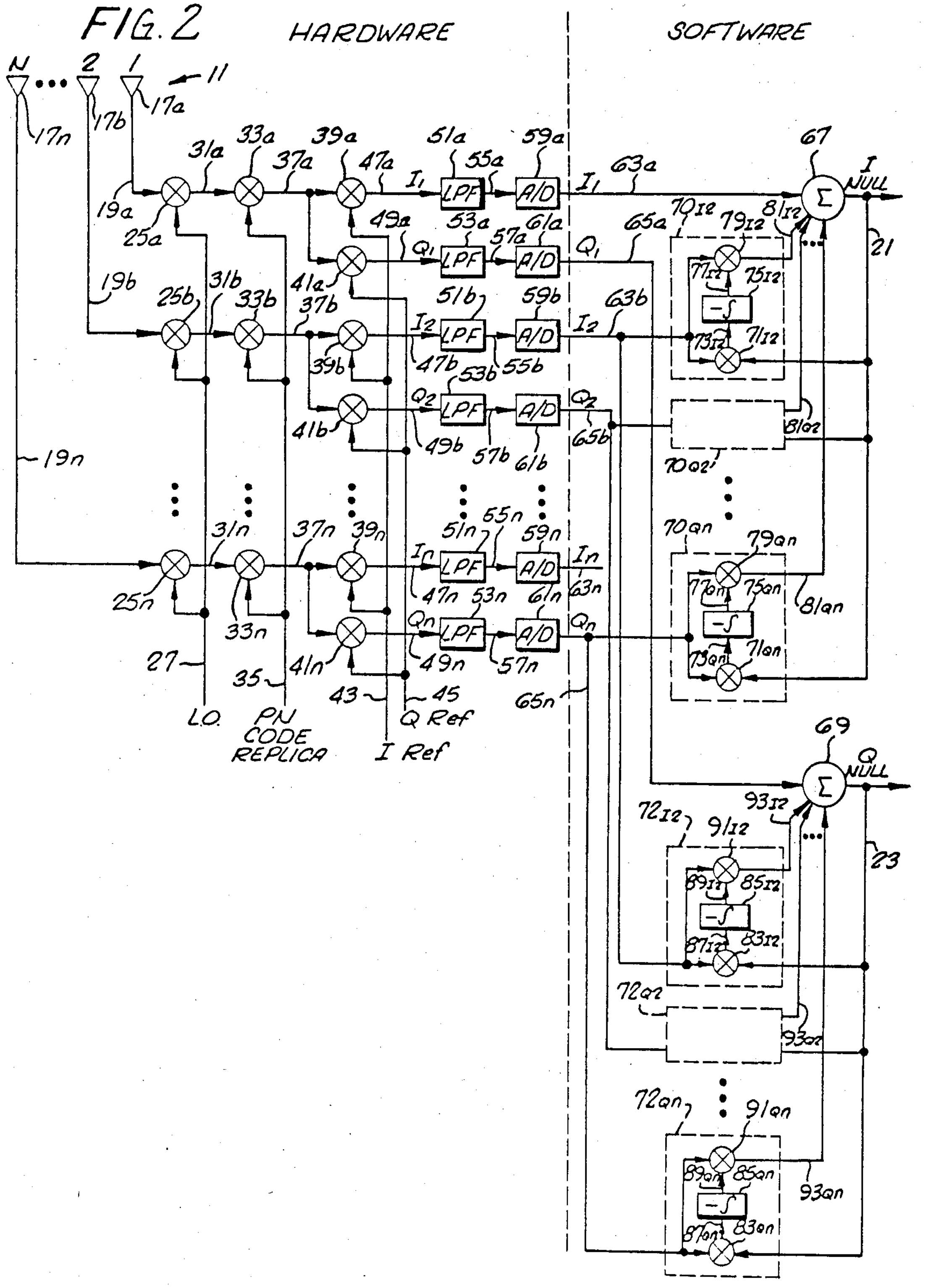
FIG. 2 is a simplified block diagram depicting the multiple antenna elements and the null processing receiver circuit of FIG. 1.

More particularly, and with reference to FIG. 2, it will be observed that the null processing receiver 13 receives the N antenna signals on lines 19*a*–19*n* from the antenna array 11 and outputs on lines 21 and 23 the respective orthogonal I and Q data signals. In generating these I and Q signals, the receiver removes a spread spectrum pn code and any interference or jamming signal contained in the original antenna signals. The I and Q signals actually are substantially the same as those produced by prior receivers. The receiver of the invention, however, produces them in a substantially simpler and more reliable fashion.

The null processing receiver 13 contains both a hardware section and a software section, with a separate, identical hardware channel being provided for each antenna signal. Addressing first the hardware channel for the antenna signal supplied on line 19*a* from the first antenna element 17*a*, it will be observed that the signal is initially connected to a mixer 25*a*. A fixed local oscillator signal is also supplied to the mixer, via line 27 from a reference oscillator 29 (FIG. 1), to down-convert the antenna signal from L-band to approximately 60 MHz. The down-converted or intermediate-frequency (i.f.) signal is supplied on line 31*a* to a second mixer 33*a*, where it is multiplied by a locally-generated replica of the modulating pn code. This replica code, which is generated by the tracking and detection circuit 15 (FIG. 1), in a conventional fashion, is supplied to the second mixer on line 35. When the replica code and the incoming pn code are properly synchronized, the second mixer essentially strips the code from the modulated signal, leaving an i.f. carrier signal modulated only by lower data rate position information. Of course, random noise and any jamming signal in the same frequency band are superimposed on the demodulated carrier. The jamming signal can be derived , for example, from a CW jammer, a broadband jammer, a swept-fm jammer, or a pulsed jammer.

The demodulated carrier signal is output by the second mixer 33*a* on line 37*a*, for connection to both a third mixer 39*a* and a fourth mixer 41*a*. These latter two mixers multiply the carrier signal by orthogonal I and Q reference carrier signals supplied on lines 43 and 45, respectively, from the tracking and detection circuit 15 (FIG. 1). These reference signals are properly synchronized with the incoming carrier, tracking any doppler shift that might be present, such that the two mixers provide orthogonal, analog baseband data signals. For this first channel, these two signals are designated $I_1$ and $Q_1$.

The respective baseband $I_1$ and $Q_1$ signals are supplied on lines 47*a* and 49*a* to a pair of low pass filters 51*a* and 53*a* and, in turn, on lines 55*a* and 57*a* to a pair of analog-to-digital converters 59*a* and 61*a*. The filtered and digitized $I_1$ and $Q_1$ signals are then output on lines 63*a* and 65*a*, respectively, for further processing in the software section of the null processing receiver 13.

As previously mentioned, the modulated antenna signals supplied on lines 19*a*–19*n*. from the antenna elements 17*a*–17*n* are each processed in a separate, identical hardware channel. The channels for the second through nth signals are identical to that for the first signal, described above. The various mixers, low pass filters, analog-to-digital converters, and signal lines in each channel are identified by the same reference numerals as the corresponding elements of the first channel, but followed by letters corresponding to the letter of the antenna signal.

The hardware section of the null processing receiver 13 thus produces n pairs of orthogonal, digitized I and Q data signals, designated $I_1$–$I_n$ and $Q_1$–$Q_n$. These data signals are supplied on lines 63*a*–63*n* and 65*a*–65*n*, respectively, to the software section of the receiver.

It will be appreciated that even with the filtering provided by the low-pass filters 51*a*–51*n* and 53*a*–53*n*, the digitized $I_1$ and $Q_1$ signals will contain significant amounts of noise, especially when a jamming signal is being received. Demodulation of the pn code provides a certain processing gain (about 40 db), but even considering this, the signal-to-noise ratio can still be as low as $-20$ to $-30$ db. By weighting the various $I_n$ and $Q_n$ signals and then summing the weighted signals, the software section of the null processing receiver 13 effectively eliminates the jamming signal component from the data and thereby improves the signal-to-noise ratio to about +10 to +20 db. By performing the nulling function after demodulation, the 40 db of processing gain sharply reduces the required dynamic range.

The digitized $I_n$ and $Q_n$ signals supplied on lines 63a-63n and 65a-65n, respectively, are further processed in a microprocessor, whose function is depicted schematically in the software section of the block diagram of FIG. 2. The function is depicted using conventional hardware elements, for ease of understanding. Those of ordinary skill in the art will be readily capable of implementing these equivalent hardware functions in a microprocessor.

More particularly, it will be observed that the software section of the block diagram of FIG. 2 can be divided into two identical sections. The upper section includes a summer 67 for producing a digital $I_{null}$ signal in which the jamming signal has been nulled out, and the bottom section includes a summer 69 for producing an orthogonal $Q_{null}$ signal in which the jamming signal likewise has been nulled out. Basically, each such section sums one digitized data signal derived from the first antenna element 17a with weighted versions of all of the digitized data signals derived from the remaining antenna elements 17b-17n. The former, non-weighted signals (i.e., $I_1$ and $Q_1$) can be termed primary information signals, and the latter, weighted signals (i.e., $I_2$-$I_n$ and $Q_2$-$Q_n$) can be termed auxiliary information signals.

The weighted signals supplied to the summer 67 are produced by weighting networks $70_{I2}$-$70_{In}$ and $70_{Q2}$-$72_{Qn}$. Similarly, the weighted signals supplied to the summer 69 are produced by weighting networks $72_{I2}$-$72_{In}$ and $72_{Q2}$-$72_{Qn}$. These networks multiply each of the 2n−2 auxiliary signals by predetermined dc weighting signals, which are generated by correlating the auxiliary signals with the summer output signals, i.e., the $I_{null}$ signal on line 21 and the $Q_{null}$ signal on line 23.

Thus, the weighting network $70_{I2}$ for the $I_2$ channel of the upper (i.e., $I_{null}$) section includes a mixer $71_{I2}$ for multiplying together the $I_2$ auxiliary signal supplied on line 63b and the $I_{null}$ signal supplied on line 21. The resulting product is supplied on line $73_{I2}$ to a negative integrator $75_{I2}$, which integrates the signal to produce a dc weighting signal output on line $77_{I2}$. A multiplier $79_{I2}$ multiplies this weighting signal by the $I_2$ auxiliary signal, to produce the weighted or intermediate signal. The latter is output by the network $70_{I2}$ on line $81_{I2}$ for coupling to the summer 67, which sums it with the $I_1$ primary signal and the weighted signals for the remaining auxiliary signal channels, to produce the $I_{null}$ signal.

A corresponding mixer, negative integrator and multiplier for each of the remaining weighting networks $70_{I3}$-$70_{In}$ and $70_{Q2}$-$70_{Qn}$ provide corresponding weighted signals for each auxilliary channel. Thus, 2n−2 sets of elements are required to produce the $I_{null}$ signal. In FIG. 2, only the elements for the $I_2$, $Q_2$ and $Q_n$ channels are shown.

The lower (i.e., $Q_{null}$) section of the right side of FIG. 2 is identical to the upper (i.e., $I_{null}$) section, except that the $Q_1$ primary signal on line 65a is substituted for the $I_1$ primary signal on line 63a. Thus, the summer 69 sums together the $Q_1$ primary signal with prescribed weighted signals for each of the auxiliary channels (i.e., $I_2$-$I_n$ and $Q_2$-$Q_n$). In the specific case of the $I_2$ channel, the weighting network $72_{I2}$ includes a mixer $83_{I2}$ for multiplying together the $I_2$ auxiliary signal and $Q_{null}$ signal, supplied on lines 63b and 23, respectively, to produce a product signal. An integrator $85_{I2}$ receives this product signal on line $87_{I2}$ and integrates it to produce a weighting signal that is then supplied on line $89_{I2}$ to a multiplier $91_{I2}$, which appropriately weights the $I_2$ signal. The resulting weighted signal is supplied on line $93_{I2}$ to the summer 69. Corresponding elements are provided for all of the auxiliary channels, FIG. 2 depicting only the $I_2$, $Q_2$ and $Q_n$ channels.

Operation of the software portion of the null processing receiver 13 will be better understood with reference to a particular example, in which a jamming signal is present in the $I_1$ and $Q_1$ primary signals and in all of the $I_2$-$I_n$ and $Q_2$-$Q_n$ auxiliary signals. If, for example, all n antenna elements 17a-17n are coplanar and the jamming signal is received from a direction normal to that plane and if the cable lengths and phase delays in the various channels all correspond exactly, then all of the I channel signals are equal to each other and all of the Q channel signals are equal to each other. In addition, the I channel signals are all uncorrelated with, i.e., orthogonal to, the Q channel signals. If we assume that the various weighting signals produced by the integrators $75_{I2}$-$75_{In}$ are all initially zero, then all of the weighted signals will likewise be zero and the $I_{null}$ signal will be identical to the $I_1$ signal. Since the $I_{null}$ and $I_2$ signals will then both contain the jamming signal, the product signal output by the mixer $71_{I2}$ will be positive and the negative integrator $75_{I2}$ will begin ramping negatively. The multiplier $79_{I2}$ therefore produces a weighted signal that is the inverse of the $I_2$ auxiliary signal, progressively increasing in amplitude. The same progression occurs in the remaining $I_n$ channels, because the jamming signal is similarly present in the auxiliary signals for those channels. The weighted signals for the $Q_2$-$Q_n$ channels will remain at zero, because the auxiliary signals for these channels are uncorrelated with the $I_{null}$ signal.

Eventually, contributions of the weighted signals will cancel out the jamming signal component of the $I_1$ primary signal such that it is completely eliminated from the $I_{null}$ signal. When this occurs, the $I_{null}$ signal will be uncorrelated with all of the auxiliary signals and the various mixers $71_{I2}$-$71_{In}$ will all produce product signals that are essentially zero. The weighting signals produced by the corresponding negative integrators $75_{I2}$-$75_{In}$ will therefore remain fixed at their current levels.

The same process is followed in the $Q_{null}$ section of the null processing receiver 13. That is, the weighting of the auxiliary signals is controllably adjusted until the $Q_{null}$ section is uncorrelated with each of the $I_2$-$I_n$ and $Q_2$-$Q_n$ auxiliary signals.

It should be noted that if the respective phase angles of the local oscillator signal or I and Q reference signals applied to the various channels are different (due to cable length variations, etc.), then the resulting magnitudes of the jamming signal components of the $I_1$-$I_n$ and $Q_1$-$Q_n$ signals also will be different. This has no effect on the receiver's performance, however, because the feedback control provided by the software implemented in the microprocessor will automatically correct for this. In addition, weighting could be provided for the $I_1$ and $Q_1$ signals, as well, with no real effect on the receiver's performance.

The separate elements 17a-17n of the antenna array 11 are arranged with respect to each other such that they provide a predetermined spatial gain, with a known pattern of lobes and nulls. That is, the antenna array's gain varies as a function of direction, with a substantially reduced gain occurring in particular directions. The weighting process performed by the microprocessor actually adjusts the antenna null pattern to align a given null or low-gain direction with the detected source of a jamming signal.

The receiver apparatus automatically nulls out a plurality of independent jamming signals. In particular, for an apparatus used with N antenna elements, up to N-1 separate jamming signals can be nulled out. The N-1 spatial nulls are all independently steerable, to track any relative movement of the sources of the jamming signals.

In situations where the direction to the source of the jamming signal continuously varies, the weighting of the various signals must vary correspondingly. The microprocessor must update the correlation between the $I_{null}$ and $Q_{null}$ signals and the various auxiliary information signals at a rate sufficiently fast to enable tracking of the jamming source direction.

As previously mentioned, the null processing receiver 13 operates to null out the strongest signal received within the frequency band of interest. This operating mode is desirable, because when a jamming signal is present it is ordinarily many times stronger than the satellite signal to be detected. When a jamming signal is not present, however, care must be taken to ensure that the receiver does not null out the desired satellite signal.

Preventing the nulling of the desired satellite signal is required only when the signal-to-noise ratio exceeds 0 db and no higher powered jamming signal is present. This can effectively be ensured by periodically substituting a non-replica of the incoming pn code, i.e., a bogey code, for the replica code ordinarily supplied to the receiver 13 on line 35. Each hardware channel therefore will be unable to properly demodulate the incoming signal and there is no risk that the receiver will inadvertently null it out. This periodic substitution of a non-replica code is preferably performed at a duty cycle of, for example, 50 percent. During alternate intervals, when the pn code replica is being supplied, the $I_{null}$ and $Q_{null}$ signals output by the receiver 13 on lines 21 and 23, respectively, will contain the desired satellite data.

The microprocessor whose function is represented by the hardware-equivalent elements depicted on the right side of FIG. 2 inherently implements a least mean-square error algorithm. This algorithm minimizes the power level of the $I_{null}$ and $Q_{null}$ signals. It will be appreciated that alternative schemes for weighting the various auxiliary signals can also be utilized. In addition, it will be appreciated that low-pass filters can be substituted for the integrators $\mathbf{75}_{I2}$–$\mathbf{75}_{Qn}$ and $\mathbf{85}_{I2}$–$\mathbf{85}_{Qn}$, without a significant effect on performance, and that a dithering process can be substituted for the correlation process performed by the mixers $\mathbf{71}_{I2}$–$\mathbf{71}_{Qn}$ and $\mathbf{83}_{I2}$–$\mathbf{83}_{Qn}$.

As an alternative to the multiple feedback loops present in the software section of FIG. 2, the $I_{null}$ and $Q_{null}$ signals could be produced using computational techniques such as direct matrix inversion. Such techniques could minimize output power, and thus null out any jamming signals, simply by appropriately correlating the various auxiliary information signals.

It should be appreciated from the foregoing description that the present invention provides an improved null processing receiver apparatus that effectively nulls out an rf interference signal without the need for any complex weighting of rf signals. A plurality of L-band antenna signals are down converted, demodulated to baseband, and converted to corresponding digital signals in separate channels. The digital signals are then appropriately weighted and summed in such a fashion as to minimize output power and, thereby, null out any undesired interference signal.

Although the present invention has been described in detail with reference to the presently preferred embodiment, those of ordinary skill in the art will appreciate that various modifications can be made without departing from the invention. Accordingly, the invention is defined only by the following claims.

I claim:

1. Signal processing receiver apparatus comprising:

demodulator means for demodulating a plurality of modulated signals to produce a primary information signal and one or more related auxiliary information signals, all of the information signals containing an interference signal;

weighting means for operating on the one or more auxililary information signals, to produce a corresponding number of intermediate signals; and summing means for summing together the primary information signal and the one or more intermediate signals to produce a sum signal in which the interference signal is substantially nulled out;

wherein the weighting means includes correlation means responsive to the one or more auxiliary information signals for producing a corresponding number of weighting signals, said correlation means including means for correlating the sum signal with each of the one or more auxiliary information signals to produce the corresponding number of weighting signals, and multiplier means for multiplying the one or more auxiliary information signals by their corresponding weighting signals to produce the one or more intermediate signals;

at least one of the primary and one or more information signals, the one or more weighting signals, the one or more intermediate signals and the sum signal being a baseband digital code signal.

2. Signal processing apparatus as defined in claim 1, wherein the correlation means includes:

means for multiplying the sum signal by each of the one or more auxiliary information signals to produce a corresponding number of product signals; and means for integrating each of the one or more product signals to produce the one or more weighting signals.

3. Signal processing apparatus as defined in claim 1, wherein:

the demodulator means includes means for multiplying each of the modulated signals by a pair of orthogonal carrier signals, to produce a pair of primary information signals and one or more pairs of related auxiliary information signals;

the weighting means includes means for operating on each of the one or more pairs of auxiliary information signals, to produce a pair of intermediate signals for each;

the summing means sums together one signal of the pair of primary information signals with one signal of each pair of intermediate signals and further sums together the other signal of the pair of primary information signals with the other signal of each pair of intermediate signals, to produce a pair of sum signals;

the correlation means is responsive to the pair of sum signals and the one or more pairs of intermediate signals to produce a corresponding number of pairs of weighting signals; and the multiplier means includes means for multiplying each signal in the one or more pairs of auxiliary information signals by its corresponding weighting signal, to produce the one or more pairs of intermediate signals.

4. Signal processing apparatus as defined in claim 1, wherein:

the plurality of modulated signals are received from a corresponding plurality of antenna elements, each modulated signal each includes a carrier signal modulated by a predetermined digital code signal; and the demodulator means includes means for multiplying each modulated signal by a common local oscillator signal to produce a corresponding plurality of modulated intermediate-frequency signals, and means for multiplying each modulated intermediate frequency signal by a common, locally-generated replica of the predetermined digital code signal, to remove the digital code signal therefrom, and for producing the primary and auxiliary information signals.

5. Signal processing apparatus as defined in claim 4, wherein:

the apparatus further includes duty cycle means for alternately enabling and not enabling the correlation means to adjust the weighting signals; and the demodulator means includes means for substituting a non-replica of the predetermined digital code signal for the signal replica whenever the duty cycle means enables the correlation means to adjust the weighting signals.

6. Signal processing apparatus as defined in claim 1, wherein the weighting means is configured such that the sum signal produced by the summing means has a minimum output power.

7. Signal processing apparatus as defined in claim 1, wherein the primary and one or more auxiliary information signals, the one or more weighting signals, the one or more intermediate signals, and the sum signal are all baseband digital code signals.

8. Signal processing apparatus as defined in claim 1, wherein:

the weighting means further includes means for operating on the primary information signal to produce a weighted primary information signal; and the summing means includes means for summing together the weighted primary information signal and the one or more intermediate signals to produce the sum signal.

9. Signal processing receiver apparatus comprising:

antenna means for supplying a plurality of rf signals each including a carrier modulated by a predetermined digital code signal and further including an interference signal;

demodulator means including means for multiplying each rf signal by a common local oscillator signal to produce a corresponding plurality of first intermediate-frequency signals, means for multiplying each first intermediate frequency signal by a common, locally-generated replica of the predetermined digital code signal, to remove the digital code signal therefrom and produce a corresponding plurality of second intermediate-frequency signals, and means for multiplying each of the second intermediate frequency signals by a pair of orthogonal reference carrier signals, to produce a pair of primary information signals and one or more pairs of related auxiliary information signals;

weighting means for operating on each of the one or more pairs of auxiliary information signals, to produce a pair of intermediate signals for each; and summing means for summing together one signal of the pair of primary information signals with one signal of each pair of intermediate signals and for further summing together the other signal of the pair of primary information signals with the other signal of each pair of intermediate signals, to produce a pair of sum signals in which the interference signal is substantially absent;

wherein the weighting means includes correlation means for correlating the pair of sum signals with the one or more pairs of intermediate signals to produce a corresponding number of pairs of weighting signals, and multiplier means for multiplying each signal in the one or more pairs of auxiliary information signals by its corresponding weighting signal, to produce the one or more pairs of intermediate signals.

10. Signal processing apparatus as defined in claim 9, wherein the correlation means includes:

means for multiplying each of the pair of sum signals by each of the one or more auxiliary information signals to produce a corresponding number of pairs of product signals; and means for integrating each of the one or more pairs of product signals to produce the one or more pairs of weighting signals.

11. Signal processing apparatus as defined in claim 9, wherein:

the apparatus further includes duty cycle means for alternately enabling and not enabling the correlation means to adjust the weighting signals; and the demodulator means includes means for substituting a non-replica of the predetermined digital code signal for the signal replica whenever the duty cycle means enables the correlation means to adjust the weighting signals.

12. Signal processing apparatus as defined in claim 9, wherein the weighting means is configured such that the pair of sum signals produced by the summing means both have minimum output power.

13. Signal processing apparatus as defined in claim 9, wherein the pair of primary information signals, the one or more pairs of auxiliary information signals, the one or more pairs of weighting signals, the one or more pairs of intermediate signals, and the pair of sum signals are all baseband digital code signals.

14. A signal processing method comprising the steps of:

demodulating a plurality of modulated signals to produce a primary information signal and one or more related auxiliary information signals, all of the information signals containing an interference signal;

weighting the one or more auxiliary information signals, to produce a corresponding number of intermediate signals; and summing together the primary information signal and the one or more intermediate signals to produce a sum signal in which the interference signal is substantially nulled out;

wherein the step of weighting includes steps of producing one or more weighting signals in response to the one or more auxilliary information signals, and multiplying the one or more auxiliary information signals by their corresponding weighting signals to produce the one or more intermediate signals;

at least one of the primary and one or more information signals, the one or more weighting signals, the one or more intermediate signals and the sum signal being a baseband digital code signal.

15. A signal processing method as defined in claim 14, wherein the step of producing includes a step of correlating the sum signal with each of the one or more auxiliary information signals to produce the corresponding number of weighting signals.

16. A signal processing method as defined in claim 15, wherein the step of correlating includes steps of:

multiplying the sum signal by each of the one or more auxiliary information signals to produce a corresponding number of products signals; and integrating each of the one or more product signals to produce the one or more weighting signals.

17. Signal processing method as defined in claim 14, wherein:

the step of demodulating includes a step of multiplying each of the modulated signals by a pair of orthogonal carrier signals, to produce a pair of primary information signals and one or more pairs of related auxiliary information signals;

the step of weighting includes a step of operating on each of the one or more pairs of auxiliary information signals, to produce a pair of intermediate signals for each;

the step of summing sums together one signal of the pair of primary information signals with one signal of each pair of intermediate signals and further sums together the other signal of the pair of primary information signals with the other signal of each pair of intermediate signals, to produce a pair of sum signals;

the step of producing responds to the pair of sum signals and the one or more pairs of intermediate signals to produce a corresponding number of pairs of weighting signals; and the step of multiplying includes a step of multiplying each signal in the one or more pairs of auxiliary information signals by its corresponding weighting signal, to produce the one or more pairs of intermediate signals.

18. A signal processing method as defined in claim 14, wherein:

the plurality of modulated signals are received from a corresponding plurality of antenna elements, each modulated signal each includes a carrier signal modulated by a predetermined digital code signal; and the step of demodulating includes steps of multiplying each modulated signal by a common local oscillator signal to produce a corresponding plurality of modulated intermediate-frequency signals, and multiplying each modulated intermediate-frequency signal by a common, locally-generated replica of the predetermined digital code signal, to remove the digital code signal therefrom, and for producing the primary and auxiliary information signals.

19. A signal processing apparatus as defined in claim 18, wherein:

the method further includes steps of alternately enabling and not enabling the step of producing to adjust the weighting signals; and the step of demodulating includes a step of substituting a non-replica of the predetermined digital code signal for the signal replica whenever the step of alternately enabling enables the step of producing to adjust the weighting signals.

20. A signal processing method as defined in claim 14, wherein the step of weighting is performed such that the sum signal produced in the step of summing has a minimum output power

21. A signal processing method as defined in claim 14, wherein the primary and one or more auxiliary information signals, the one or more weighting signal, the one or more intermediate signal, and the sum signal are all baseband digital code signals.

22. A signal processing method as defined in claim 14, wherein:

the step of weighting further includes a step of weighting the primary information signal to produce a weighted primary information signal; and the step of summing includes a step of summing together the weighted primary information signal and the one or more intermediate signals to produce the sum signal.

* * * * *